United States Patent
Mettälä et al.

(10) Patent No.: US 7,571,194 B2
(45) Date of Patent: Aug. 4, 2009

(54) APPLICATION DATA SYNCHRONIZATION IN TELECOMMUNICATIONS SYSTEM

(75) Inventors: Riku Mettälä, Tampere (FI); Jussi Piispanen, Tampere (FI); Mikko Juhani Sahinoja, Tamere (FI)

(73) Assignee: Nokia Corporation, Espoo (FI)

( * ) Notice: Subject to any disclaimer, the term of this patent is extended or adjusted under 35 U.S.C. 154(b) by 716 days.

(21) Appl. No.: 10/670,597

(22) Filed: Sep. 25, 2003

(65) Prior Publication Data

US 2004/0215669 A1    Oct. 28, 2004

Related U.S. Application Data

(63) Continuation of application No. PCT/FI02/00251, filed on Mar. 25, 2002.

(30) Foreign Application Priority Data

Mar. 26, 2001    (FI) ............................... 200101617

(51) Int. Cl.
*G06F 17/30* (2006.01)
(52) U.S. Cl. .......................... 707/201; 707/10; 707/100
(58) Field of Classification Search ..................... 707/1, 707/10, 200, 204, 201, 202, 203, 100
See application file for complete search history.

(56) References Cited

U.S. PATENT DOCUMENTS

| | | | |
|---|---|---|---|
| 6,000,000 A | 12/1999 | Hawkins et al. | |
| 6,131,096 A | 10/2000 | Ng et al. | 707/10 |
| 6,295,541 B1 * | 9/2001 | Bodnar et al. | 707/203 |
| 6,308,201 B1 * | 10/2001 | Pivowar et al. | 709/214 |
| 6,553,037 B1 * | 4/2003 | Pivowar et al. | 370/463 |
| 6,643,669 B1 * | 11/2003 | Novak et al. | 707/201 |
| 6,882,659 B1 * | 4/2005 | Novak et al. | 370/466 |
| 2002/0059256 A1 * | 5/2002 | Halim et al. | 707/10 |
| 2002/0078075 A1 * | 6/2002 | Colson et al. | 707/204 |
| 2002/0081995 A1 * | 6/2002 | Leppinen et al. | 455/412 |
| 2002/0099727 A1 * | 7/2002 | Kadyk et al. | 707/201 |
| 2002/0116500 A1 * | 8/2002 | Arora et al. | 709/227 |

(Continued)

FOREIGN PATENT DOCUMENTS

JP    2000-020370    1/2000

OTHER PUBLICATIONS

2000, SyncML Building an Industry-Wide Mobile Data Synchronization Protocol, 14 pgs.

(Continued)

*Primary Examiner*—Cheryl Lewis
(74) *Attorney, Agent, or Firm*—Hollingsworth & Funk, LLC

(57) ABSTRACT

A method of arranging data synchronization of at least one application in a networked system, which comprises at least one terminal, at least one synchronization server, a first database in the terminal, and a second database. In the method, a configuration message is formed which comprises data required for the application data synchronization, said data comprising settings of at least the second database. The configuration message is transmitted from the synchronization server to the terminal. A synchronization connection is arranged between the terminal and the synchronization server to perform the synchronization. The synchronization is initialized using the arranged synchronization connection and at least part of said data, data of the first database and the second database being synchronized using at least part of said data.

24 Claims, 2 Drawing Sheets

U.S. PATENT DOCUMENTS

2004/0058710 A1* 3/2004 Timmins et al. ............ 455/560

OTHER PUBLICATIONS

SyncML Sync Protocol, version 1.0, Dec. 7, 2000.
SyncML Sync Representation Protocol, version 1.0, Dec. 2000.
Printed from internet Mar. 5, 2001, Internet Assigned Numbers Authority, Media Content Types, http:/www.isi.edu/in-notes/iana/assignments/media-types/media-types.

Mobile Phone Tool Application, Go for Mastery!, Mobile i, Japan, Softbank Publishing Inc., Jan. 1, 2000, vol. 6, No. 1, p. 118-119. No translation available.

Keiichi Yamamoto, PDA Synchronization Tool Realization of the Coordination of Popular PDA and Notes at a High Level, Intellisync for IBM WorkPad Version 3, IJ Puma Technology, Lotus Notes Magazine, Japan, Softbank Publishing Inc., May 13, 1999, No. 31, p. 57-59. No translation available.

* cited by examiner

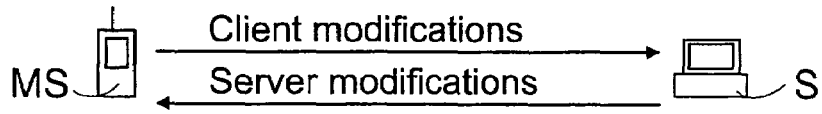
Fig. 1
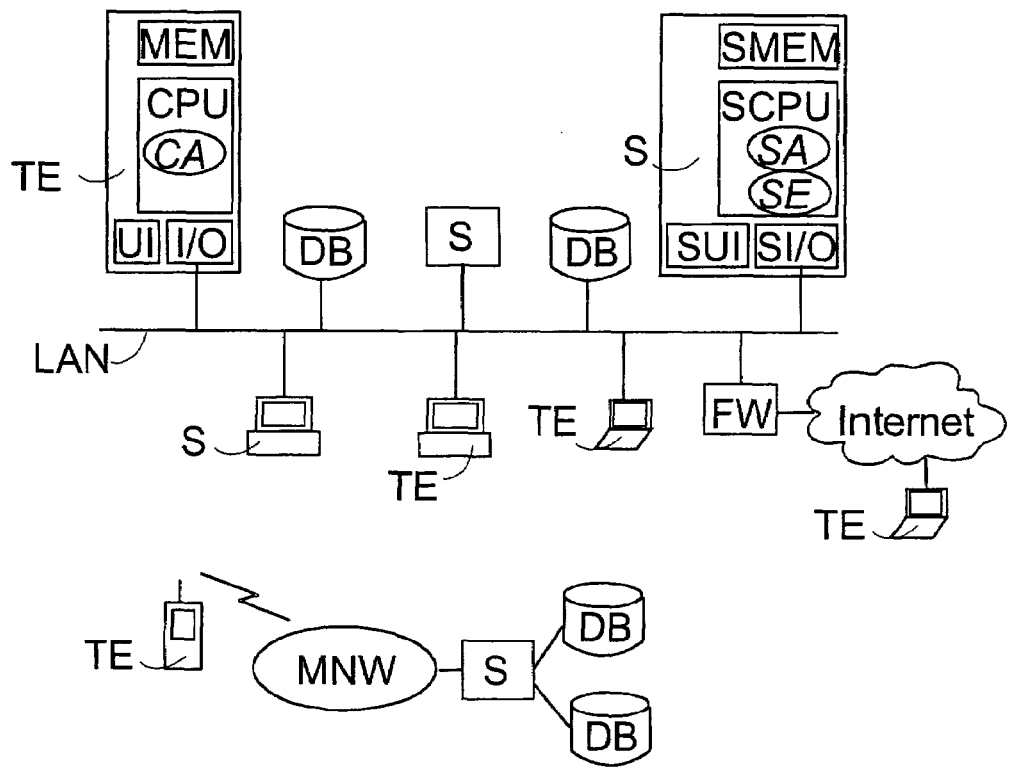
Fig. 2
| MIMEH | SyncSettings | Version | Name | Host Addr. | Info |
|---|---|---|---|---|---|
| Port | Auth | AuthLevel | AuthScheme | Username | Cred |
| ConRef | ConType | Bearer | AddrType | Addr | RemoteDB |
| URI | CTType | CTVer | Conditions | | |
Fig. 4

APPLICATION DATA SYNCHRONIZATION IN TELECOMMUNICATIONS SYSTEM

This application is a Continuation of International Application PCT/FI02/00251 filed on 25 Mar. 2002, which designated the U.S. and was published under PCT Article 21(2) in English.

BACKGROUND OF THE INVENTION

The invention relates to data synchronization in a telecommunications system, particularly to application data synchronization in a networked system comprising at least one terminal, at least one synchronization server and at least one database. Data synchronization is an operation in which a correspondence between at least two data collections is created in such a way that, after the synchronization, the information units of the data collections substantially correspond to each other.

Data of portable terminals, such as portable computers, PDA (Personal Digital Assistant) devices, mobile stations or pagers, can be synchronized with network applications, desktop computer applications or other databases in a telecommunications system. Typically, data of calendar and e-mail applications, in particular, are synchronized. Synchronization has previously been based on different manufacturer-specific protocols which are not compatible with each other. This restricts the use of the terminals and data types used and is typically difficult for the user. In mobile communication, in particular, it is important to acquire and update data irrespective of the terminal or application used.

The SyncML (Synchronization Markup Language), which is based on the XML (Extensible Markup Language), has been provided for improved application data synchronization. The SyncML synchronization protocol using messages in the SyncML format allows data synchronization in any application between any networked terminals. For example, a calendar entry in a mobile station is automatically synchronized with the network calendar used by a company secretary. The SyncML synchronization protocol operates in both wireless and wired networks and supports several transfer protocols. The SyncML synchronization protocol can be implemented, for example, on top of the HTTP protocol (Hyper Text Transfer Protocol), the WSP protocol (Wireless Session Protocol) of the WAP (Wireless Application Protocol) standard, the OBEX protocol used for cable links, such as the USB (Universal Serial Bus) or RS-232, or for short-range radio frequency (Bluetooth) links or infrared (IrDA) links, on top of a TCP/IP (Transport Control Protocol/Internet Protocol) stack, and also on top of an e-mail protocol (SMTP, Simple Mail Transfer Protocol).

FIG. 1 illustrates a synchronization example in which a mobile station MS functions as a SyncML client terminal and a network server S functions as a SyncML server. In the SyncML synchronization service, a synchronization session is first initialized, whereby for example the database to be synchronized is selected. The SyncML client terminal MS comprises a Sync Client Agent and sends a SyncML message (Client Modifications) comprising at least information on the data that is the object of the synchronization in the mobile station MS and that has changed after the previous synchronization. The SyncML server S comprises a Sync Server Agent controlling the synchronization and a Sync Engine, and it usually waits for the initiation of the SyncML client (MS) for synchronization. The server S synchronizes the data, i.e., analyzes the modifications made to the data of the database and client terminal and makes the data coherent (makes the necessary modifications, replacements and deletions). After this, the SyncML server S returns the server modifications to the SyncML client (MS). The above-described example is simple, but nevertheless, it illustrates the roles of the devices in the SyncML standard. The SyncML client terminal (MS) is typically a mobile station, a PC (Personal Computer), a laptop computer, or a PDA device. The SyncML server S is typically a network server or a PC.

Various settings relating to the synchronization must be defined for the terminal comprising a SyncML client agent before synchronization with the SyncML server can be performed. These settings include the address of the SyncML server and the addresses and types of the databases used. Users typically have several databases to synchronize, so that each database requires settings of its own. Users find entering these settings manually and even accepting completed settings difficult and laborious.

BRIEF DESCRIPTION OF THE INVENTION

An object of the invention is to avoid the above-described problems and to provide data synchronization as easy as possible in different terminals. The objects of the invention are achieved with a method, telecommunications system, synchronization server, telecommunications device, computer programs and data storage media, which are characterized by what is stated in the independent claims. Preferred embodiments of the invention are described in the dependent claims.

The invention is based on the idea that at least one configuration message comprising data required for at least the enabling of synchronization is transmitted from a synchronization server to a terminal comprising a synchronization application, wherein the data at least comprises settings of one or more databases. The terminal can store the data in its memory, and the synchronization is carried out using at least part of the stored data. Thus, a synchronization connection is arranged between the terminal and the synchronization server, and the synchronization is initialized using the arranged synchronization connection and at least part of said data. At least data in a first database (in the terminal) and in a second database can subsequently be synchronized based on at least part of said data. The term 'database' is to be understood in a broad sense to refer to a data collection of any data source or data storage, which can be updated with one or more applications. The term 'synchronization connection' refers to a logical data transmission connection which is formed to begin the synchronization. The initialization of synchronization refers to preparation for the actual synchronization, for example the initialization of a synchronization session according to the SyncML standard.

The arrangement according to the invention provides the advantage that the user does not have to enter the required settings manually, but they can be sent from the synchronization server and taken automatically into use in the terminal. The commissioning and use of the synchronization service is thus easy and as transparent as possible for the user. The invention is particularly advantageous when there is a plurality of databases, whereby the database settings of the terminal can be completed at one time with a single configuration message. Thus, also, data transmission capacity is consumed as little as possible.

According to a preferred embodiment of the invention, the database settings comprise the name and address of at least one database and the information on the content types supported. During the initialization of the synchronization, the stored address is thus transmitted from the terminal to the synchronization server if data in the database in question needs to be synchronized. This embodiment brings about the advantage that all data needed to describe the databases are obtained from the server to the terminal, and the user does not need to enter them himself. On the basis of the type of the database, databases can be separated for different applications, for example for calendar or e-mail, or on the basis of other criteria, for instance according to whether it is a personal calendar, a calendar for work, or a group calendar. The content type refers to the format in which the data is transferred in the synchronization. Thus, on the basis of the content types supported by the database, it is known in the terminal as early as before the first synchronization whether data in the database can be synchronized via the server. If the terminal and the database support several content types that are the same, the most desired content type can be selected in the terminal for synchronization.

According to another preferred embodiment of the invention, the data also comprise user text, whereby the user text is displayed to the user of the terminal. Thus, different instructive texts can be transmitted from the synchronization server to inform and instruct the user.

According to yet another preferred embodiment of the invention, the data further comprise settings determining the timing of the synchronization, and the initialization of the synchronization session is started from the terminal at the moment of time according to said settings. The advantage of this is that the timing of the synchronization can be determined from the server (for example by the service provider), and the terminal can be arranged to start the synchronization automatically in accordance with said settings.

BRIEF DESCRIPTION OF THE DRAWINGS

The invention will now be described in greater detail in connection with preferred embodiments, with reference to the attached drawings, of which FIG. 1 shows synchronization according to the SyncML synchronization protocol;

FIG. 2 shows a wireless network and a local area network;

FIG. 4 shows a configuration message according to a preferred embodiment of the invention.

DETAILED DESCRIPTION OF THE INVENTION

Figure 3:
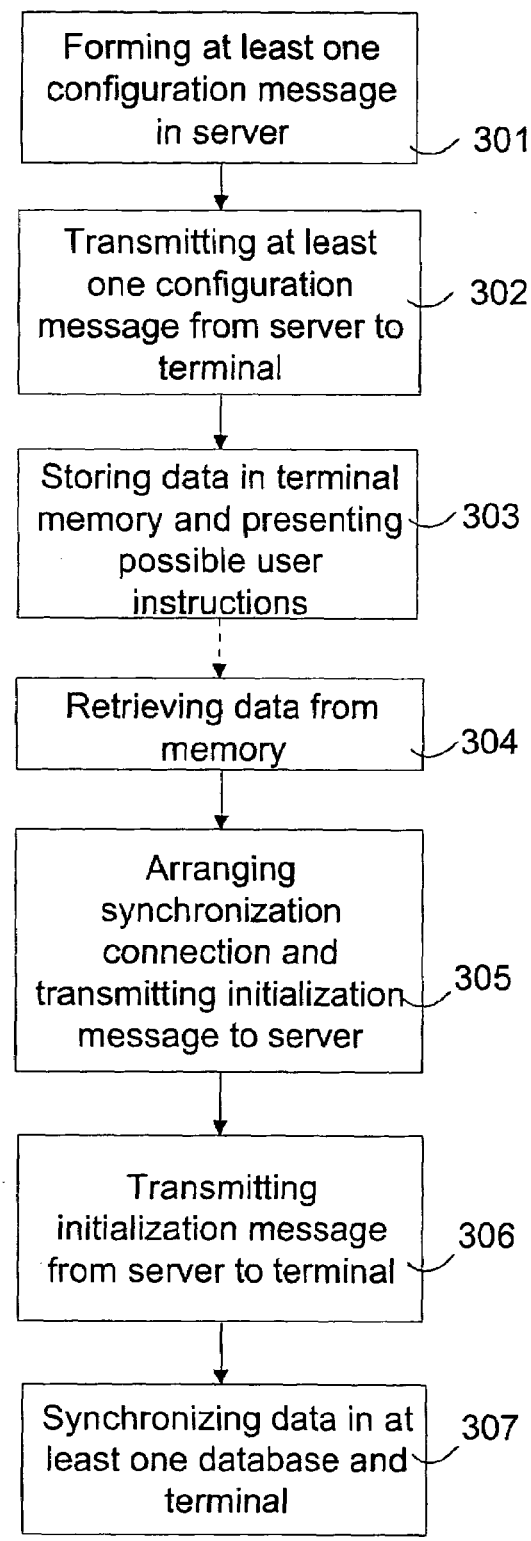
FIG. 3 shows a method according to a preferred embodiment of the invention.

A preferred embodiment of the invention is described in the following in a system supporting the SyncML standard, without, however, confining the application range of the invention thereto. The invention can be applied in arranging the data synchronization in any system supporting any synchronization technique.

FIG. 2 shows a networked system which allows data synchronization in databases DB and terminals TE. As regards the synchronization, the terminal TE functions as the client device. FIG. 2 shows two examples, in the first of which terminals TE, databases DB and synchronization servers S are connected to a local area network LAN. The terminal TE connected to the network LAN comprises functionality, for instance a network interface card and software controlling the data transmission, for communicating with the devices of the network LAN. The local area network LAN can be a local area network of any type, and the TE can be in connection with the server S also via the Internet, typically using a firewall FW. In the second example, a terminal TE, a synchronization server S and databases DB are connected to a mobile network MNW. The terminal TE connected to the network MNW comprises mobile station functionality for wireless communication with the network MNW. The mobile network MNW can be any known wireless network, for example a network supporting the GSM service, a network supporting the GPRS service (General Packet Radio Service), a third-generation mobile network, such as the UMTS (Universal Mobile Telecommunications System) network, a wireless local area network WLAN or a private network. It should be noted that the server S can function as the database DB, although in FIG. 2 the servers S and databases DB are shown separately for the sake of clarity.

The terminals TE (in wired networks LAN and in wireless networks MNW) and the servers S comprise memory MEM; SMEM, a user interface UI; SUI, I/O means I/O; SI/O for arranging data transmission, and a central processing units CPU; SCPU comprising one or more processors. In the memory MEM, SMEM there is a non-volatile portion for storing the applications for controlling central processing unit CPU, SCPU, and a random access memory portion to be used for processing data. In the memory MEM of the TE (is a first database to be synchronized), and in the memory of the databases DB, the application data being the object of the synchronization are maintained. A client agent CA operating in accordance with the invention is preferably implemented by executing in the CPU computer program code stored in the memory MEM. Also the synchronization server S provides a synchronization agent SA and a synchronization engine SE according to the invention preferably by executing in the SCPU computer program code stored in the memory SMEM. The computer program code performed in the central processing units CPU and SCPU causes the terminal TE and the synchronization server S to implement the inventive features, one embodiment of which is illustrated in FIG. 3. The computer programs can be obtained and/or stored in memory means, for instance on a disk, CD-ROM disk or in other external data storage media, from which they can be loaded into the memory MEM, SMEM. Integrated circuits can also be used.

FIG. 3 illustrates a synchronization method according to an embodiment of the invention. In the synchronization server S, at least one configuration message is formed 301 in accordance with a preferred embodiment of the invention. The server agent SA can collect data required for the arrangement of the synchronization for the terminal TE and form a configuration message CM. These data preferably includes the settings of one or more databases DB, especially the address and name of the database, the information on the content types supported, or other database features, the start settings relating to the starting time of the synchronization, the user instructions relating to the synchronization or the information of the server S. Other database features can include for instance an attribute defining whether the database is public or private (e.g. group calendar or private calendar). The addresses of the databases DB can be presented as either absolute or relative with regard to the address of the server S. The data in question have typically been stored in the memory SMEM of the synchronization server S, but S can, when required, retrieve them from the databases DB. The formation 301 of the configuration message can be started at the request of the terminal TE or at the request of the service provider of the local area network LAN or the mobile network MNW. The configuration message can be sent for example when the user has bought a terminal TE or registered into a service of the service provider. In accordance with a preferred embodiment of the invention, the configuration message is automatically transmitted from the server S when the data required for the synchronization have changed. For example, when the address of the database DB changes or when a new database has been taken into use, the server S sends a configuration message comprising the new address or a configuration message comprising the settings of the new database to all users of the database DB.

At least one configuration message formed is transmitted 302 from the synchronization server S to the terminal TE. When receiving the configuration message, the TE stores 303 at least part of the data in the message in its memory MEM, and it can present the possible user instructions in the user interface UI.

The formation of the synchronization connection and the initialization of the synchronization session can be started 304, 305 later in accordance with the stored data, at the starting time of the synchronization that is possibly determined in the start settings. The starting time can be determined in a plurality of ways, for example at certain intervals. The synchronization service can also be started on the initiative of the user or the synchronization server. Thus, the databases to be synchronized are determined on the basis of the application or a command by the user, or all databases whose settings are stored can be synchronized. Here, too, data stored in the memory MEM can be utilized, for instance data on the content types of the databases. If the synchronization service is started on the initiative of the server S, it also starts the formation of a logical synchronization connection.

The use of configuration messages brings about a plurality of advantages: the usability of the synchronization service is improved, because all the data required for the synchronization can be transmitted at one time, and the definition of the settings for the terminal takes place automatically and quickly after the reception of the configuration message. When all the data required is transmitted in one message, the use of the resources of the network and the terminal is efficient, and several authentications are not required, for instance.

When synchronization service is needed, the client agent CA searches 304 the memory MEM for data, particularly the settings of the databases DB. The client agent CA forms a client initialization message, for the transmission of which a logical synchronization connection is formed, and an initialization message is transmitted 305 from the terminal TE to the server S defined in the data. A logical synchronization connection is formed even if the data transmission itself takes place using connectionless protocols. The logical synchronization connection can be arranged via the transmission of the initialization message, or exchange of previous messages can be performed. In the initialization message, the synchronization server S is informed on which databases' data is to be synchronized and which synchronization type is used, typically also authentication information and information on the service and device properties supported by the terminal TE. Also, a user text can be stored in the memory MEM, to be displayed at this stage to inform the user on the synchronization to be performed and aspects relating thereto.

Having received the initialization message, the server S completes the initialization by responding with an initialization message 306 of its own. The initialization message comprises device and authentication information of the server. When the initialization has been completed, data of at least one database DB and terminal TE determined in the initialization of the synchronization can be 307 synchronized. The synchronization server S is thus arranged to perform 307 the data synchronization using at least part of the initialization message data, which has been transmitted (305) from the terminal. Finally, the result of the synchronization can be displayed to the user.

The synchronization type to be used may be for instance:
two-way synchronization;
slow synchronization;
one-way synchronization from client only;
refresh synchronization from client only;
one-way synchronization from server only;
refresh synchronization from server only;
server-alerted synchronization.

As for a more detailed description of the initialization of a synchronization session and synchronization 307 of data, the standard SyncML Sync Protocol, version 1.0, December 2000, is incorporated as reference herein. However, configuration messages according to the invention can be used for transmitting data relating to the synchronization of any synchronization method.

It is to be observed that the synchronization (307) can, contrary to FIG. 3, be started without separate initialization messages (305 to 306). In such a case, the initialization is performed simultaneously with the synchronization. Configuration messages can, however, be used in the way illustrated in FIG. 3, for defining the settings of the initialization of the synchronization, and of the synchronization. Thus, the number of messages to be transmitted can be reduced.

FIG. 4 illustrates contents of a configuration message according to a preferred embodiment of the invention. The configuration messages can be distinguished by a given type of a given MIME type (Multipurpose Internet Mail Extensions) MIMEH added to the message.

In accordance with a preferred embodiment of the invention, configuration messages are in the XML format. The configuration message is thus a message in the XML format, comprising data transmitted from the synchronization server S to the terminal TE, relating to the arrangement of synchronization, particularly to the performance of the initialization of the synchronization. For the configuration messages, a document type definition DTD is defined which determines in the XML language the used tags, structural proportions of the elements (!ELEMENT) between the tags, and other XML document definitions. As is very well known for the XML language, an element begins with a start-tag (e.g. <section>) and ends with an end-tag (</section>), and it can contain text or other elements. A DTD is included in all configuration messages transmitted by the synchronization server, or the configuration messages refer to a DTD already known by the terminal TE. The following represents an exemplary DTD for a configuration message:

```
<!ELEMENT SyncSettings (Version, HostAddr, Port?,
RemoteDB+, Name?, Info?, Auth*, ConRef?, Condition?)>
<!ELEMENT Version (#PCDATA)>
<!ELEMENT HostAddr (#PCDATA)>
<!ELEMENT Port (#PCDATA)>
<!ELEMENT RemoteDB ((CTType, CTVer*)+, URI, Name?)>
<!ELEMENT URI (#PCDATA)>
<!ELEMENT CTType (#PCDATA)>
<!ELEMENT CTVer (#PCDATA)>
<!ELEMENT URI (#PCDATA)>
<!ELEMENT Name (#PCDATA)>
<!ELEMENT Info (#PCDATA)>
<!ELEMENT Auth (AuthLevel, AuthScheme, ((Username |
Cred) | (Username, Cred)))>
<!ELEMENT AuthLevel (#PCDATA)>
<!ELEMENT AuthScheme (#PCDATA)>
<!ELEMENT Username (#PCDATA)>
```

-continued

```
<!ELEMENT Cred (#PCDATA)>
<!ELEMENT ConRef (ConType, ((Bearer?, AddrType, Addr) | RefID)) >
<!ELEMENT ConType (#PCDATA)>
<!ELEMENT Bearer (#PCDATA)>
<!ELEMENT AddrType (#PCDATA)>
<!ELEMENT Addr (#PCDATA)>
<!ELEMENT RefID (#PCDATA)>
<!ELEMENT Condition (#PCDATA)>
```

The question mark '?' expresses that the particular element is optional. The sign '+' expresses that the element occurs once or more than once. It is to be observed that all elements are not mandatory and that the invention can also be applied using elements that differ from what is presented herein. The following describes the different elements of the configuration message of FIG. 4 in more detail:

SyncSettings. This element is a root element determined in the XML language, comprising the tags of the other elements. On the basis of the root element it is observed that the message concerns specifically a configuration message comprising data relating to the arrangement of the synchronization.

Version. This element determines the version of the configuration message format. When the format of the configuration message is changed substantially, the number of the version must also be changed.

Name. This element determines the displayable name of the data (configuration message) relating to the arrangement of the synchronization or of the database. If this element is used within the root element SyncSettings, it determines the name of said data. If the element is used within the element RemoteDB, it determines the displayable name of the database. The name can also be displayed to the user.

Host Addr. This element contains the host address of the SyncML synchronization service (service agent SA). This is typically an IP address or a uniform resource locator URL. A telephone number or a device tag can also be used.

Info. This element contains text that can be displayed to the user when the synchronization message is received (303) or later (305). The user text can be for instance short information on the synchronization service or instructions to control the actions of the user. This element can also be in the element RemoteDB, whereby database-specific data can be presented to the user.

Port. This element determines the TCP port of the synchronization server S (SyncML synchronization service). All configuration messages should support this element. If the element is not determined, the default port value is 80.

Auth. This element can contain other four elements (AuthLevel, AuthScheme, ((Username|Cred)|(Username, Cred))). This element determines the authentication methods and credentials used in the SyncML session. The element can be used in the authentication of the transport protocol layer, for example HTTP protocol or the transport layer (WSP) of the WAP protocol, or in the authentication of the SyncML service. The element comprises information on the authentication level, the authentication method, the user identifier and the credentials.

AuthLevel. This element determines the authentication level. The authentication level is presented numerically for example in the way indicated in Table 1 as follows.

TABLE 1

| Authentication level | Value | Description |
| --- | --- | --- |
| SyncML server | '1' | Used in credentials of element SyncHdr |
| SyncML database | '2' | Used in credentials of SyncML database level |
| HTTP/WSP | '3' | HTTP level authentication |
| OBEX | '4' | OBEX authentication |

AuthScheme. This element determines the authentication method. The value can be numeric or it can be determined in the way indicated in Table 2.

TABLE 2

| Authentication method | Value |
| --- | --- |
| Basic | '1' |
| Digest (MD5) | '2' |

Username. This element determines the user name for the authentication on the SyncML synchronization service level or the transfer protocol level. The element AuthLevel determines the authentication level for which the given user name is intended.

Cred. This element determines the authentication credentials. The element AuthLevel determines the authentication level for which the credentials are intended. If the authentication method is 'Basic' or 'Digest', the credentials contain a password for the user identifier determined in the element UserName.

ConRef. This element determines a reference to the physical or logical access point (connection reference), which is used with these synchronization settings. The element contains the elements ConType, ((Bearer?, AddrType, Addr)|RefID)).

ConType. This element determines the connection type, which can be presented in the way indicated in Table 3.

TABLE 3

| Connection type | Value | Description |
| --- | --- | --- |
| WAP 1.x proxy | '1' | — |
| HTTP/WAP 2.x (WAP NG) proxy | '2' | — |
| Logical access point | '3' | Name according to which the access points are grouped |
| Physical access point | '4' | Refers to real address: bearer service, address type, address value |

If the connection type is WAP 1.x server, the HTTP/WAP 2.x proxy server, or a logical access point, the contents of the element RefID are used to determine the connection reference. If the physical access point is used, the contents of the elements Bearer, AddrType and Addr determine the connection reference.

Bearer. This element determines the bearer service type of the connection reference. The type of the bearer service can be determined for example in the way indicated in the table of Appendix 2, without, however, being confined to the bearer service types presented therein.

AddrType. This element determines the address type of the connection reference. The address type can be presented numerically in the way indicated in Table 4.

TABLE 4

| Address type | Value | Description |
| --- | --- | --- |
| IPV4 | '1' | IPv4 address as hexadecimal numbers |
| IPV6 | '2' | IPv6 address as hexadecimal numbers |
| E164 | '3' | Telephone number according to E164 definition |
| ALPHA | '4' | General alphanumeric address |
| APN | '5' | Access point name APN |

Addr. This element determines the address of the connection reference. The address can be for example a telephone number or an IP address. The type of the address is determined in the AddrType element or on the basis of the address value itself.

RefID. This element determines the logical reference value of the connection reference. The reference value is the logical name or another tag of the connection point.

RemoteDB. This element determines one or more databases whose data is synchronized. The element may contain five elements ((CTType, CTVer*)+, URI, Name?, Info?). The element may further contain other definitions relating to the database, or user text.

URI. This element determines the relative or absolute URI (Universal Resource Indicator) of the database. The URI can be later used within SyncML alert and synchronization commands, used in the initialization of the synchronization session and the synchronization to indicate the database to be synchronized.

The element URI may also have additional attributes, which allow a more detailed description of the properties of the database or the application in question. The additional attributes may be further specified by defining e.g. whether a calendar is a personal calendar, a calendar used at work, or a family calendar. The additional attributes may be defined by means of indicators in a text format, for example, to be added to the element URI (see Appendix 2), or by using one or more specific elements. The additional attributes may be presented in the element URI in the way indicated in 'SyncML Representation Protocol, version 1.0', of the SyncML standard, December 2000, Chapter 4.18. Thus, there may be various types of databases in the same address (URI) which must be distinguished from each other with additional attributes in the configuration message. The synchronization (304 to 307) can be determined for different types of databases URI in the terminal TE on the basis of the data of this element, for example by using different initialization settings for different types.

CTType. This element determines the media content types supported by the database. In this way, the type of the database can be defined; the types include for instance a calendar, contacts, notes, short messages, multimedia messages, images, e-mail or other type. The WWW site http://www.isi.edu/in-notes/iana/assignments/media-types/media-types presents IANA's (Internet Assigned Numbers Authority) media content types, which can be used in this element. The value of this element can be for example text/x-vcard, text/vcard, text/x-vcalendar, or text/vcalendar.

CTVer. This element determines the version of the content type supported. If the content type, i.e. the MIME type has several different versions, this element is obligatory (e.g. text/html 1.1/1.2./1.3).

Condition. This element contains parameters or conditions concerning the start of the synchronization. For example, it can be determined that the synchronization is started every five hours.

In accordance with a preferred embodiment of the invention, additions can be made to previous data relating to the databases DB stored in the terminal TE, or this data can be replaced with new data on the basis of the data of the configuration message. Thus, there is preferably a field in the configuration message that determines whether the data concerned is new data, replacement data or additional data. On the basis of this field, the terminal TE can store the configuration message data correctly. In order to implement this embodiment, separate tags, for instance <replace/>, <add/> or <new/>, can be used below the root element SyncSettings.

The elements are not in any way confined to the above-described elements and their application is not confined to the XML format but data can be transmitted in configuration messages in the HTML format, for example. Appendix 2 further presents a cleartext XML example of a configuration message comprising elements of the DTD described above.

Although the above-described elements contain references to the WAP standard according to a preferred embodiment of the invention (whereby the synchronization would preferably take place utilizing the WSP protocol), the transmission of configuration messages is not, however, confined thereto. For example HTTP or OBEX standards and transmission techniques of lower layers supported by these standards can also be used.

In accordance with a preferred embodiment of the invention, the synchronization server S connected to a wireless telecommunications system encodes (step 301) the configuration messages into the binary WBXML (Wireless Binary XML) format. The documents in the XML format can be converted into the WBXML format (or HTML format). The use of the WBXML format brings about the advantage that the amount of data transmission capacity required is decreased, which is particularly advantageous in the transmission of a radio interface. The WBXML format is preferable when configuration messages are transferred using mechanisms providing restricted data transmission capacity, for instance in short message service SMS. Appendix 3 further presents a possibility for token assignments to attach the above-described elements into the WBXML format.

If transmitted using the push service of the WSP protocol, configuration messages must be assigned to a predetermined WDP (Wireless Datagram Protocol) port. The terminal TE must listen to this port. Transmission on a lower level can take place using any transmission protocol supported by the WAP protocol, for example using SMS or other signalling-type transmission manners (e.g. USSD; Unstructured Supplementary Service Data), or using circuit-switched data calls or packet-transmitted data transmission services.

It is obvious to a person skilled in the art that as the technology advances, the basic idea of the invention can be implemented in a plurality of ways. Therefore, the invention and embodiments thereof are not confined to the above-described examples but can vary within the scope of the claims.

APPENDIX 1

| Bearer service type | Value |
|---|---|
| GSM-USSD | '1' |
| GSM-SMS | '2' |
| ANSI-136-GUTS | '3' |
| IS-95-CDMA-SMS | '4' |
| IS-95-CDMA-CSD | '5' |
| IS-95-CDMA-PACKET | '6' |
| ANSI-136-CSD | '7' |
| ANSI-136-GPRS | '8' |
| GSM-CSD | '9' |
| GSM-GPRS | '10' |
| AMPS-CDPD | '11' |
| PDC-CSD | '12' |
| PDC-PACKET | '13' |
| IDEN-SMS | '14' |
| IDEN-CSD | '15' |
| IDEN-PACKET | '16' |
| FLEX/REFLEX | '17' |
| PHS-SMS | '18' |
| PHS-CSD | '19' |
| TETRA-SDS | '20' |
| TETRA-PACKET | '21' |
| ANSI-136-GHOST | '22' |
| MOBITEX MPAK | '23' |
| OBEX | '24' |

APPENDIX 2

```
<SyncSettings>
    <Version>1.0</Version>
    <Name>Synchronization Server</Name>
    <HostAddr>http://www.syncserver.com
/sync</HostAddr>
    <Info>This is a synchronization server for your
use.</Info>
    <Port>8080</Port>
    <Auth>
        <AuthLevel>3</AuthLevel>
        <AuthScheme>1</AuthScheme>
        <Username>virtanen</Username>
        <Cred>password</Cred>
    </Auth>
    <Auth>
        <AuthLevel>1</AuthLevel>
        <AuthScheme>1</AuthScheme>
        <Username>mvirtan</Username>
        <Cred>password</Cred>
    </Auth>
    <ConRef>
        <ConType>1</ConType>
        <RefID>Nokia AP</RefID>
    </ConRef>
    <RemoteDB>
        <URI>./Contacts?CLASS&EQ;PRIVATE
</URI>
        <CTType>text/x-vcard</CTType>
        <CTVer>2.1</CTVer>
        <Name>Private Contact DB</Name>
    </RemoteDB>
    <RemoteDB>
        <URI>./Calendar</URI>
        <CTType>text/x-vcalendar</CTType>
        <CTVer>1.0</CTVer>
        <Name>Calendar DB</Name>
    </RemoteDB>
    <Condition>Every fifth hours</Condition>
</SyncSettings>
```

APPENDIX 3

| Element | WBXML token (hexadecimal value) |
|---|---|
| Addr | 05 |
| AddrType | 06 |
| Auth | 07 |
| AuthLevel | 08 |
| AuthScheme | 09 |
| Bearer | 0A |
| ConRef | 0B |
| ConType | 0C |
| Cred | 0D |
| CTType | 0E |
| CTVer | 0F |
| HostAddr | 10 |
| Name | 11 |
| Port | 12 |
| RefID | 13 |
| RemoteDB | 14 |
| SyncSettings | 15 |
| URI | 16 |
| Username | 17 |
| Version | 18 |
| Info | 19 |
| Conditions | 1A |

The invention claimed is:

1. A method comprising:
    forming a configuration message comprising settings information for arranging data synchronization of at least one application between a first database, in a terminal, and a second database, associated with a synchronization server, said settings information comprising settings of at least the second database;
    transmitting said configuration message from the synchronization server to the terminal;
    initializing the synchronization using a synchronization connection between the terminal and the synchronization server according to at least part of said settings information, and
    synchronizing data of at least the first database and the second database according to at least part of the settings information.

2. A method according to claim 1, wherein the settings of said second database comprise at least one of the name of the second database, information on the content types supported, and an address, and wherein at least said address is received in a client initialization message from the terminal to the synchronization server as a response to a need to synchronize data of the second database.

3. A method according to claim 1, wherein said settings information further comprises user text to be displayed to the user of the terminal.

4. A method according to claim 1, wherein said settings information further comprises settings defining the timing of initialization of the synchronization.

5. A method according to claim 1, wherein said configuration message comprises at least one field which defines whether said settings information is new, replacing previous settings or complementary.

6. A method according to claim 1, wherein said configuration message is an Extensible Markup Language document in a binary or text format.

7. A method according to claim 1, wherein said configuration message is transmitted using one or more of the following protocols: Short Message Service, Object Exchange, Hyper Text Transfer Protocol, or Wireless Application Protocol.

8. A method according to claim 1, wherein the data transmission between the synchronization server and the terminal is based on the wireless application protocol stack, and the initialization of the synchronization and the synchronization is based on the SyncML synchronization protocol performed on top of the wireless application protocol stack.

9. A method according to claim 1, wherein said settings information comprises settings of a plurality of databases, and data of at least the first database and said plurality of databases is synchronized according to at least part of said settings information.

10. A telecommunications system comprising:
at least one terminal including a first database; and
at least one synchronization server configured to form a configuration message comprising settings information for arranging data synchronization of at least one application between the first database and a second database associated with the synchronization server, said settings information comprising settings of at least the second database, and to transmit said configuration message to the terminal;
wherein the terminal is configured to store said settings information in the received configuration message to a memory medium, and retrieve at least part of said settings information as a response to a need for a synchronization service;
wherein the terminal and the synchronization server are configured to establish a synchronization connection between the terminal and the synchronization server for the performance of the synchronization, and
initialize the synchronization using the synchronization connection and at least part of said settings information; and
wherein the synchronization server is further configured to synchronize data of at least the first database and the second database using at least part of said settings information.

11. A telecommunications system according to claim 10, wherein said settings information comprises at least one of the following:
settings relating to the timing of the start of the synchronization;
the name and address of at least the second database, and the data on the content types supported by it;
user text, which is displayed to the user in the terminal;
settings of the synchronization server.

12. A synchronization server comprising:
a processing unit configured to
form a configuration message comprising settings information for arranging data synchronization of at least one application between a first database, in a terminal, and a second database, associated with the synchronization server, said settings information comprising settings of at least the second database;
transmit said configuration message from the synchronization server to the terminal;
initialize the synchronization using a synchronization connection between the terminal and the synchronization server according to at least part of said settings information; and
synchronize data of at least the first database and the second database according to at least part of said settings information.

13. A synchronization server according to claim 12, wherein said settings information comprises at least one of the following:

settings relating to the timing of the start of the synchronization;
the name and address of at least the second database, and the data on the content types supported by it;
user text to be displayed to the user;
settings of the synchronization server.

14. A telecommunications device comprising:
a receiver configured to receive at least one configuration message comprising settings information for arranging data synchronization of at least one application between a first database, in the communication device, and a second database, associated with a synchronization server, said settings information comprising settings of at least the second database;
a memory configured to store said settings information; and
a processing unit configured to
retrieve at least part of said settings information as a response to a need for a synchronization service;
establish a synchronization connection between the telecommunications device and the synchronization server to perform the synchronization; and
initialize synchronization with the synchronization server using at least part of said settings information retrieved from memory.

15. A telecommunications device according to claim 14, wherein said settings information further comprises settings defining the timing of the synchronization; and the processing unit is further configured to start the establishing of the synchronization connection and the initialization of the synchronization at the moment of time according to said settings information.

16. A telecommunications device according to claim 14, wherein said settings information further comprises user text; and the processing unit is further configured to display the user text to the user of the telecommunications system.

17. A telecommunications device according to claim 14, wherein said settings of at least the second database comprise at least the name of the database, information on the content types supported, and an address, and
the processing unit is further configured to transmit in the initialization of the synchronization at least said address to the synchronization server as a response to the need to synchronize data of said database.

18. A telecommunications device according to claim 14, wherein the telecommunications device is wireless and supports the wireless application protocol and the syncml synchronization protocol performed on top of the wireless application protocol;
the processing unit is configured to communicate with the synchronization server using the wireless application protocol; and
the telecommunications device further comprises a client agent configured to communicate with a server agent, of the synchronization server, in accordance with the syncml synchronization protocol.

19. A computer-readable data storage medium, wherein said data storage medium comprises a computer program product, said computer program product comprises:
a computer code configured to receive at least one configuration message comprising settings information for arranging data synchronization of at least one application between a first database, in a communication device, and a second database, associated with a synchronization server, said settings information comprising at least settings of the second database;

a computer code configured to store said settings information in a memory;

a computer code configured to establish a synchronization connection between the telecommunications device and the synchronization server to perform the synchronization;

a computer code configured to retrieve at least part of said settings information as a response to a need for a synchronization service; and a computer code configured to initialize synchronization with the synchronization server using at least part of said settings information retrieved from the memory.

20. A computer-readable data storage medium, wherein said data storage medium comprises a computer program product, said computer program product comprises:

a computer code configured to form a configuration message comprising settings information for arranging data synchronization of at least one application between a first database, in a terminal, and a second database, associated with a synchronization server, said settings information comprises settings of at least a second database;

a computer code configured to transmit said configuration message from the synchronization server to at least one terminal;

a computer code configured to initialize synchronization using synchronization connection, between the terminal and the synchronization server, according to at least part of said settings information; and a computer code configured to synchronize data of at least a first database and the second database according to at least part of said settings information.

21. A method comprising:

receiving at least one configuration message comprising settings information for arranging data synchronization of at least one application between a first database, in a telecommunication device, and a second database, associated with a synchronization server, said settings information comprising settings of at least the second database;

storing said settings information in a memory;

retrieving at least part of said settings information as a response to a need for a synchronization service;

establishing a synchronization connection between the telecommunications device and the synchronization server to perform the synchronization; and initializing synchronization with the synchronization server using at least part of said settings information retrieved from memory.

22. A method according to claim 21, wherein said settings information further comprises settings defining the timing of the synchronization; and said establishing of the synchronization connection and the initialization of the synchronization starting at the moment of time according to said settings information.

23. A method according to claim 21, wherein said settings information further comprises user text; and the method further comprises displaying the user text to the user of the telecommunications device.

24. A method according to claim 21, wherein said setting of at least the second database comprise at least the name of the database, information on the content types supported, and address; and the method further comprises transmitting in the initialization of the synchronization at least said address to the synchronization server as a response to the need to synchronize data of said database.

* * * * *

UNITED STATES PATENT AND TRADEMARK OFFICE
CERTIFICATE OF CORRECTION

PATENT NO. : 7,571,194 B2
APPLICATION NO. : 10/670597
DATED : August 4, 2009
INVENTOR(S) : Mettälä et al.

It is certified that error appears in the above-identified patent and that said Letters Patent is hereby corrected as shown below:

On the Title Page Item (75):

Inventors: "Riku Mettälä" should read --Riku Mikko Mettälä--.
"Mikko Juhani Sahinoja, Tamere (FI)" should read --Mikko Juhani Sahinoja, Tampere (FI)--.

On the Title Page Item (30), Foreign Application Priority Data:

"200101617" should read --20010617--.

Signed and Sealed this

Third Day of November, 2009

David J. Kappos
*Director of the United States Patent and Trademark Office*